(12) United States Patent
Yazdani et al.

(10) Patent No.: US 9,524,114 B2
(45) Date of Patent: Dec. 20, 2016

(54) OPTIMIZING SYNCHRONOUS WRITE VIA SPECULATION

(71) Applicant: Futurewei Technologies, Inc., Plano, TX (US)

(72) Inventors: Reza Yazdani, Los Altos, CA (US); Chen Tian, Union City, CA (US)

(73) Assignee: Futurewei Technologies, Inc., Plano, TX (US)

( * ) Notice: Subject to any disclaimer, the term of this patent is extended or adjusted under 35 U.S.C. 154(b) by 37 days.

(21) Appl. No.: 14/606,803

(22) Filed: Jan. 27, 2015

(65) Prior Publication Data

US 2016/0216905 A1 Jul. 28, 2016

(51) Int. Cl.
*G06F 3/06* (2006.01)

(52) U.S. Cl.
CPC ............ *G06F 3/0619* (2013.01); *G06F 3/061* (2013.01); *G06F 3/065* (2013.01); *G06F 3/0634* (2013.01); *G06F 3/0659* (2013.01); *G06F 3/0685* (2013.01)

(58) Field of Classification Search
CPC .... G06F 3/0619; G06F 3/0685; G06F 3/0634; G06F 3/061; G06F 3/065; G06F 3/0659
See application file for complete search history.

(56) References Cited

U.S. PATENT DOCUMENTS

| | | | | |
|---|---|---|---|---|
| 6,757,767 B1 * | 6/2004 | Kelleher | ............... | G06F 3/0613 710/107 |
| 2003/0145155 A1 * | 7/2003 | Wolrich | ............... | G06F 9/3851 711/104 |
| 2007/0050538 A1 | 3/2007 | Northcutt et al. | | |
| 2007/0083715 A1 | 4/2007 | Vanderpool | | |
| 2008/0104334 A1 * | 5/2008 | Bellaton | .............. | G06F 12/0842 711/141 |
| 2009/0019256 A1 * | 1/2009 | Kneebone | ............... | G06F 12/10 711/209 |
| 2010/0250792 A1 | 9/2010 | Harriman et al. | | |
| 2012/0304159 A1 * | 11/2012 | Ceze | ........................ | G06F 8/44 717/140 |

(Continued)

FOREIGN PATENT DOCUMENTS

| | | |
|---|---|---|
| CN | 1932791 A | 3/2007 |
| CN | 102326156 A | 1/2012 |

OTHER PUBLICATIONS

"Synchronous and Asynchronous I/O," Synchronous and Asynchronous I/O (Windows), Windows, Dev Center—Desktop, http://web.archive.org/web/20111004012327/http://msdn.microsoft.com/en-us/library/windows/desktop/aa365683%28v-VS.85%29.aspx, Oct. 3, 2010, 3 pages.

(Continued)

*Primary Examiner* — Idriss N Alrobaye
*Assistant Examiner* — Ronald Modo
(74) *Attorney, Agent, or Firm* — Conley Rose, P.C.

(57) ABSTRACT

A method implemented in a data processing system comprising receiving an input/output (IO) write request from a processing thread to transfer data from a memory of the data processing system to an IO device, setting the memory as read-only memory to protect the data from overwrite before the data is transferred to the IO device, and sending, in response to the IO write request, a speculative IO write completion response to the processing thread to enable the processing thread to continue execution without waiting for the data to be transferred to the IO device.

15 Claims, 13 Drawing Sheets

(56) References Cited

U.S. PATENT DOCUMENTS

2014/0143611 A1    5/2014  Cargnoni et al.
2014/0283040 A1*   9/2014  Wilkerson .............. G06F 21/52
                                                      726/22

OTHER PUBLICATIONS

Chen, "Optimizing Delay in Delayed-Write File Systems," University of Michigan CSE-TR-293-96, May 1996, 12 pages.
Foreign Communication From a Counterpart Application, PCT Application No. PCT/CN2016/071593, International Search Report dated Apr. 25, 2016, 7 pages.
Foreign Communication From a Counterpart Application, PCT Application No. PCT/CN2016/071593, Written Opinion dated Apr. 25, 2016, 4 pages.

* cited by examiner

OPTIMIZING SYNCHRONOUS WRITE VIA SPECULATION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In computing, input/output (IO) is the communication between a data processing system or information system, such as a computer, and external devices. The external devices may include storage devices (e.g., disk drives), user interface devices (e.g., keyboard, mouse, and monitor), printers, and any other data processing system. In a computer system, a central processing unit (CPU) processes data and transfers the data into and out of the system. The external devices that receive outputs or provide inputs to the data processing system are referred to as IO devices. Some data-intensive applications may store a large amount of data in a variety of external storage devices. Different IO devices may vary substantially in characteristics. Some IO devices perform at substantially slower speeds than CPUs due to the physical nature of the IO devices. Thus, IO read request queues and/or write request queues may be long. As such, the average completion time for IO writes and/or reads may be large.

SUMMARY

In one embodiment, the disclosure includes a method implemented in a data processing system comprising receiving an IO write request from a processing thread to transfer data from a memory of the data processing system to an IO device, setting the memory as read-only memory to protect the data from overwrite before the data is transferred to the IO device, and sending, in response to the IO write request, a speculative IO write completion response to the processing thread to enable the processing thread to continue execution without waiting for the data to be transferred to the IO device.

In another embodiment, the disclosure includes a computer program product comprising computer executable instructions for a file handler and an exception handler stored on a non-transitory computer readable medium such that when executed by a computing device, causes the file handler to receive a first message from a processing thread comprising an IO write request to transfer data from a memory of the computing device to an IO device, configure the exception handler to protect the data from overwrite before the data is completely transferred to the IO device, and send a second message comprising a speculative IO write completion response to the processing thread without waiting for the data to be completely transferred to the IO device, wherein the speculative IO write completion response enables the processing thread to continue execution.

In yet another embodiment, the disclosure includes an apparatus comprising an IO interface port configured to communicate with an IO device, a memory coupled to the IO interface port, and a processor coupled to the memory and the IO interface port, wherein the processor is configured to receive a first message from a processing thread, wherein the first message comprises an IO write request to transfer data from the memory to the IO device, send, in response to the IO write request, a second message comprising a speculative write completion response to the processing thread to enable the processing thread to continue execution before the data is transferred to the IO device, receive a third message comprising an IO read request to read the data from the IO device, wherein the third message is received before the data is transferred to the IO device, and read the data directly from the memory in response to the IO read request.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
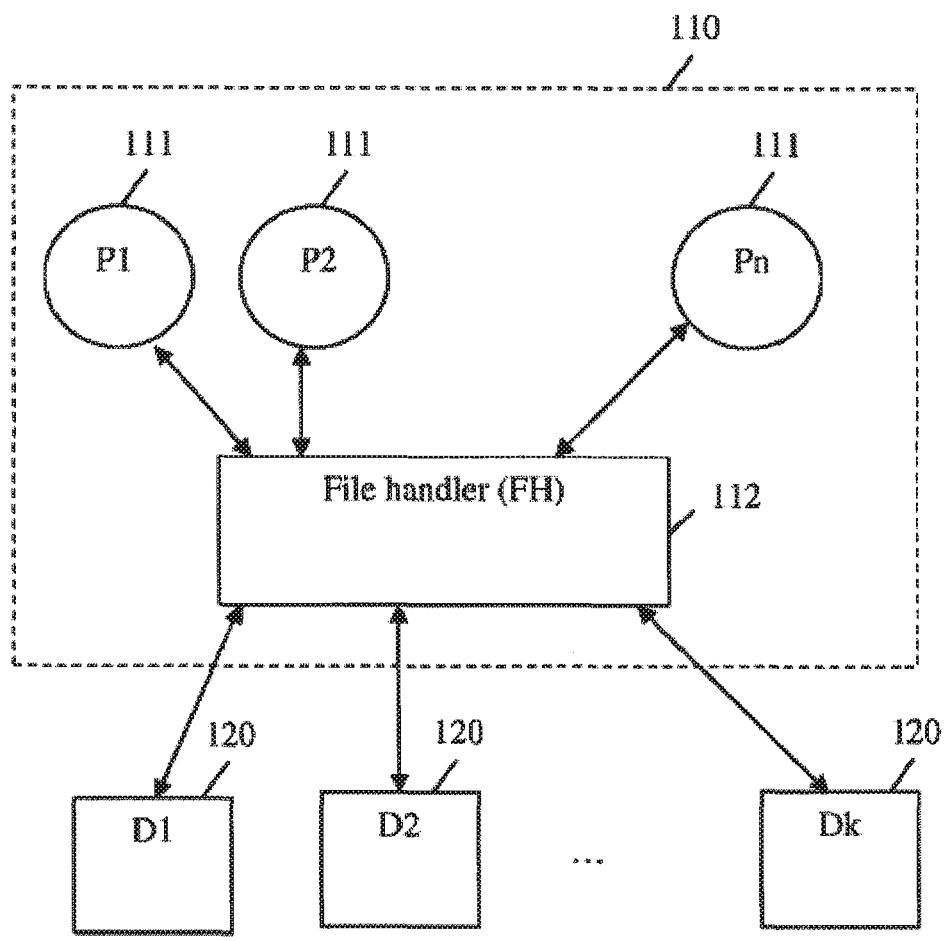
FIG. 1 is a schematic diagram of an embodiment of an IO system.

FIG. 1 is a schematic diagram of an embodiment of an IO system 100. The IO system 100 comprises a data processing system 110 and a plurality of IO devices 120. The data processing system 110 comprises a plurality of processing threads 111 and a file handler (FH) 112. As shown in FIG. 1, the number of processing threads 111 is N and the number of devices 120 is K, where the processing threads 111 are denoted as P1 to Pn and the IO devices 120 are denoted as D1 to Dk. The IO devices 120 are any devices configured to communicate with the data processing system 110 by transferring data into and out of the data processing system 110. For example, the IO devices 120 may be storage devices, network devices, user interface devices, and/or other data processing systems substantially similar to the data processing system 110.

The processing threads 111 and the FH 112 are software components executing in the data processing system 110. The processing threads 111 and the FH 112 may be executed on one or more processors of the data processing system 110. The processing threads 111 may correspond to one or more application programs. The FH 112 is configured to interface with the processing threads 111 and the IO devices 120. The FH 112 handles IO data transfer between the data processing system 110 and the IO devices 120. In an embodiment, a processing thread 111 may determine to read data from an IO device 120. The processing thread 111 calls the FH 112 to request an IO read operation, for example, by sending an IO read request to the FH 112. Upon receiving the IO read request, the FH 112 initiates a read operation with the IO device 120 and subsequently receives the requested data from the IO device 120. After receiving the requested data, the FH 112 sends an IO read completion to the processing thread 111 to indicate the requested data is read from the IO device 120. For example, the requested data may be stored at a memory location or buffer provided by the processing thread 111 or the FH 112.

In another embodiment, a processing thread 111 may determine to write data to an IO device 120. The processing thread 111 calls the FH 112 to request an IO write operation, for example, by sending an IO write request to the FH 112. Upon receiving the IO write request, the FH 112 initiates a write operation with the IO device 120 and subsequently transfers the data to the IO device 120. After completing the transfer, the FH 112 sends a write completion to the processing thread 111 to indicate the data is successfully written to the device 120. In one embodiment, the FH 112 transfers the data directly from the memory location provided by the processing thread 111 to the IO device 120. In another embodiment, the FH 112 copies the data to an internal memory and returns execution to the caller or the processing thread 111 that requested the IO write. In some embodiments, the data processing system 110 comprises one or more device driver software components that interface the FH 112 to the IO devices 120.

IO reads and/or writes may be performed synchronously or asynchronously. A synchronous IO write operation does not return until data is written to an IO device, such as the IO device 120 and a synchronous IO read operation does not return until data is read from the IO device 120 and stored in the memory of the system, such as the data processing system 110. As such, the completion time of IO writes depend on the response time of IO devices. Many IO devices are slow devices, and thus synchronous IOs may delay application processing and reduce system performance. On the contrary, an asynchronous write operation may return before writing data to an IO device and an asynchronous read operation may return before data is read from the IO device 120. Asynchronous read and/or write enable the caller or the processing thread, such as the processing thread 111 to switch to another job while the IO transfer is in progress. However, the caller or the processing thread is responsible to manage and determine the completion of the requested IO operations such that data may not be overwritten or read prematurely during IO transfer. The management of the IO transfer completion may be complex and the caller may only switch back to the job that processes the IO data after the completion of the IO transfer. Thus, similar to the synchronous IOs, asynchronous IOs may delay application processing and reduce system performance.

Disclosed herein are embodiments of speculative synchronous IO write and IO read-ahead mechanisms that provide more efficient IO operations when compared to synchronous and asynchronous IO operations. When a first processing thread P1 requests an FH to write data from a block of memory M to an IO device, the FH marks the memory M as read-only (e.g., by setting a read-only flag), sends a speculative write completion to the first processing thread P1, and dynamically links an exception handler to the first processing thread P1. The speculative write completion is a speculation or an assumption that the memory M is unchanged until the data is completely written to the IO device. The speculative write completion enables the first processing thread P1 to proceed without waiting for the completion of the writing of the data to the IO device. The exception handler protects the memory M from overwrite prior to the completion of the IO write operation. For example, when the exception handler detects a write attempt to the memory M, the exception handler may stop the write attempt from proceeding by notifying the FH and/or interrupting the first processing thread P1. After completing the IO write operation, the FH clears the read-only flag and unlinks the exception handler. In addition, when a second processing thread P2, different from the first processing thread P1, requests to read the data from the IO device before the data is written to the IO device, the FH performs an IO read-ahead operation. The IO read-ahead operation comprises redirecting the IO read request to read the data directly from the memory M without waiting for the completion of the IO write operation. In an embodiment, the FH employs an internal buffer B located at a memory different from the memory M for IO write. The FH copies the data from the memory M to the internal buffer B, clears the read-only flag after copying the data to the internal buffer B, and transfers the data from the internal buffer B to the IO device. In an embodiment, the read-only access is applied to an entire memory page that comprises the memory M. In such an embodiment, the exception handler blocks memory write to the memory M, but allows memory writes to other memory locations of the memory page while an IO write operation is operating on the memory M. The disclosed speculative synchronous IO write and IO read-ahead mechanisms optimize IO processing efficiency by removing the IO device transfer time from the thread processing time.

Figure 2:
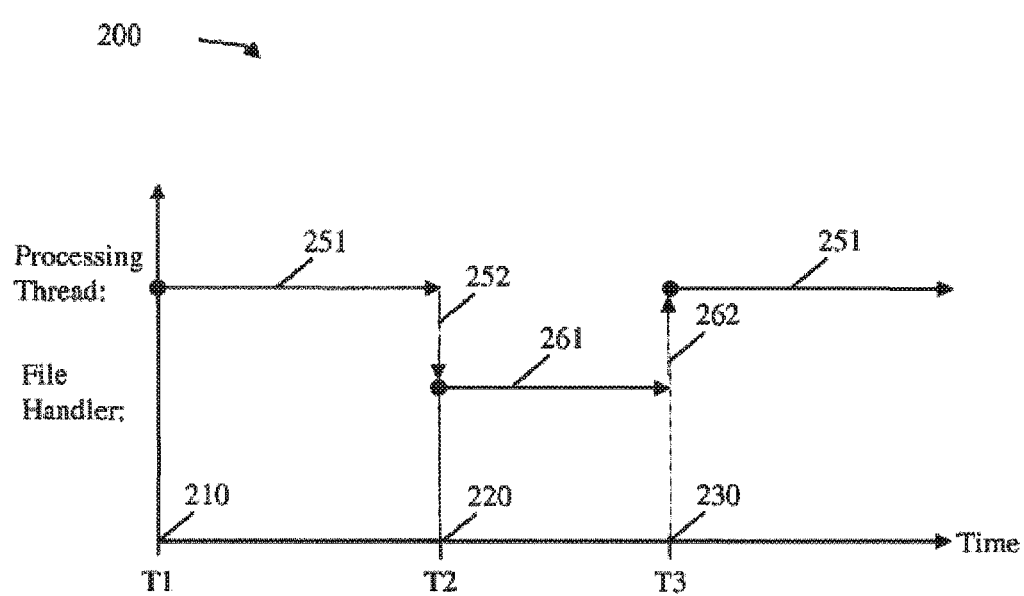
FIG. 2 is a timing diagram of an embodiment of a synchronous IO method.

FIG. 2 is a timing diagram of an embodiment of a synchronous IO method 200. The method 200 is implemented in a data processing system, such as the data processing system 110. The timing diagram illustrates activities of a processing thread, such as the processing thread 111, and a file handler, such as the FH 112, during a synchronous IO operation. At time 210, denoted as T1, the processing thread starts an execution 251 that invokes an IO operation, such as an IO read or an IO write to an IO device 120. At time 220, denoted as T2, the processing thread sends a request 252 to the file handler to perform the IO operation and enters a thread wait state (shown as a gap in the processing thread activity for the processing thread). Upon receiving the request 252, the file handler performs an IO data transfer 261 as requested by the processing thread. At time 230, denoted as T3, the file handler completes the requested IO operation and sends an IO completion notification 262 to the processing thread. Upon receiving the IO completion notification 262, the processing thread exits the thread wait state and continues with the execution 251. As shown in the method 200, synchronous IO waits until the requested IO operation is completed before proceeding, and thus may delay application processing and/or response time.

Figure 3:
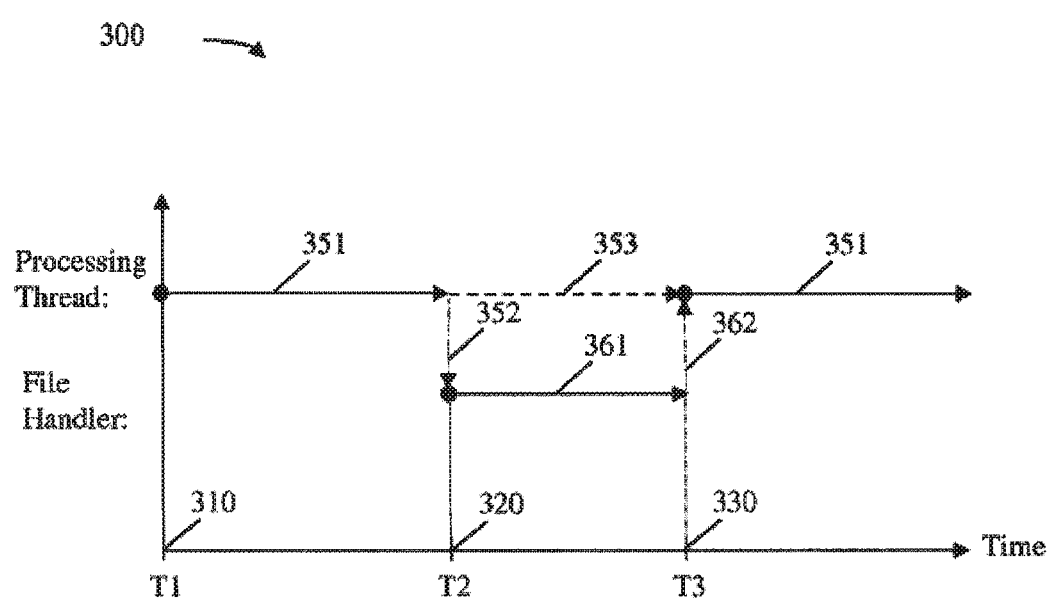
FIG. 3 is a timing diagram of an embodiment of an asynchronous IO method.

FIG. 3 is a timing diagram of an embodiment of an asynchronous IO method 300. The method 300 is implemented in a data processing system, such as the data processing system 110. The timing diagram illustrates activities of a processing thread, such as the processing thread 111, and a file handler, such as the FH 112, during an asynchronous IO operation. At time 310, denoted as T1, the processing thread starts an execution, for example, as part of a first job 351 that invokes an IO operation, such as an IO read or an IO write to an IO device, such as the IO device 120. At time 320, denoted as T2, the processing thread sends a request 352 to the file handler to perform the IO operation and proceeds to processing a second job 353. Upon receiving the request 352, the file handler performs an IO transfer 361 as requested by the processing thread. At time 330, denoted as T3, the file handler completes the IO transfer 361 and sends an IO completion notification 362 to the processing thread to indicate the completion of the requested IO operation. Upon receiving the IO completion notification 362, the processing thread interrupts the second job 353 and continues with the first job 351. As shown in the method 300, asynchronous IO switches from the first job 351 to the second job 353 while the IO transfer 361 is in progress and switches back to the first job 351 after the completion of the requested IO operation. Thus, threads that invoke IO processing may be slow and the processing and/or response time may be dependent on the speed of the IO devices because the threads requesting IO may not move forward until the IO is complete.

Figure 4:
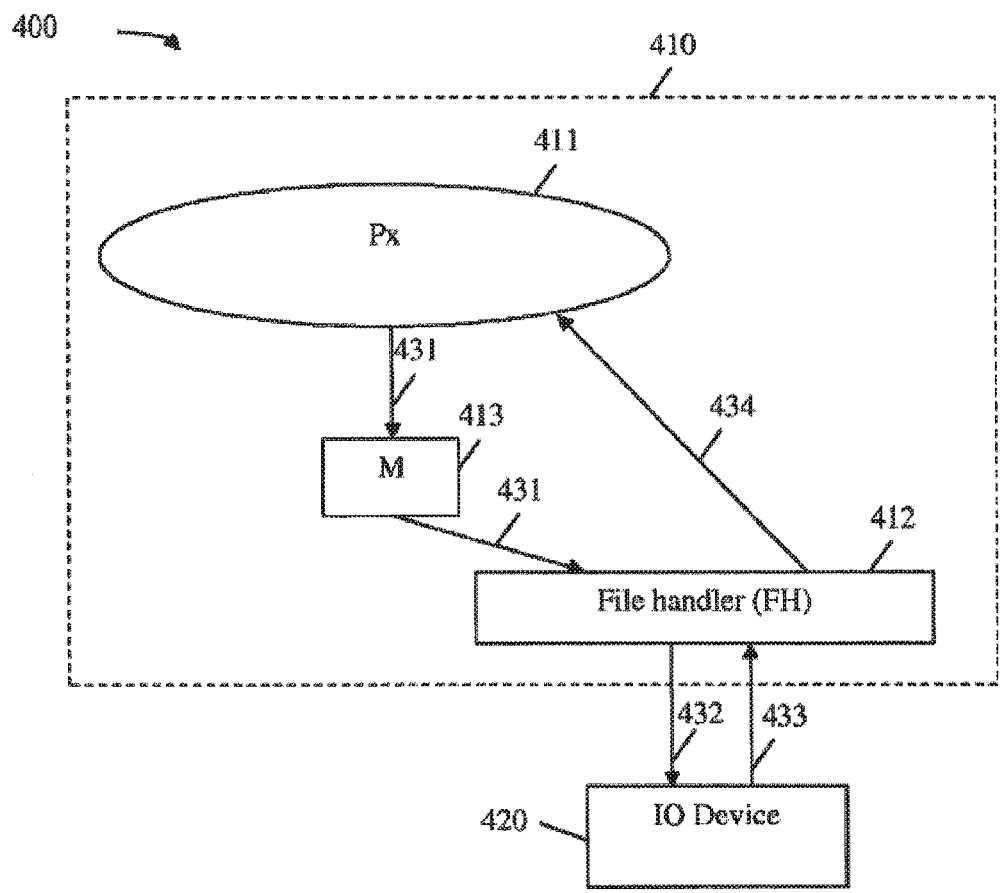
FIG. 4 is a schematic diagram illustrating an embodiment of a synchronous IO write operation in an IO system.

FIG. 4 is a schematic diagram illustrating an embodiment of a synchronous IO write operation in an IO system 400. The IO system 400 is substantially similar to the IO system 100 and employs substantially similar IO mechanisms as described in the method 200, but provides a more detailed view of the sequences of interactions between the components of the IO system 400 during a synchronous write operation. The IO system 400 comprises a data processing system 410, similar to the data processing system 110, and an IO device 420, similar to the IO device 120. The data processing system 410 comprises a processing thread 411, denoted as Px, similar to the processing thread 111, an FH 412, similar to the FH 112, and a memory block 413, denoted as M. The memory block 413 may be located within a memory storage unit (e.g., random access memory (RAM)) of the data processing system 410 and configured to store data content. The memory storage unit may be referred to as the data processing system's main memory. In some embodiments, the processing thread 411 may be allocated with a portion of the main memory, where the processing thread 411 may read and/or write to the portion of the main memory during execution. Thus, the memory block 413 is located within the allocated memory.

In FIG. 4, a synchronous write operation begins at step 431 when the processing thread 411 requests the FH 412 to write the data stored in the memory block 413 to the IO device 420, for example, via a function call or sending a message. After requesting the IO write, the processing thread 411 waits for the completion of the IO write. For example, the processing thread 411 may enter a thread wait state. At step 432, upon receiving the request, the FH 412 interfaces with the IO device 420 to transfer the data from the memory block 413 to the IO device 420. At step 433, the IO device 420 sends a notification to the FH 412 to indicate that the data is fully written to the IO device 420. At step 434, the FH 412 returns to the processing thread 411 notifying the processing thread 411 that the data in the memory block 413 is written to the IO device 420. Upon receiving the notification, the processing thread 411 exits the thread wait state and continues execution. It should be noted that the steps 432 and 433 may include one or more transactions and may vary depending on the hardware characteristics or implementations of the IO device 420 and the data processing system 410. In addition, the inter-process or inter-thread communication mechanisms between the processing thread 411, the memory 413, and the FH 412 at steps 431 and 434 may vary depending on the software architecture or implementation of the data processing system 410. However, the processing thread 411 stops and waits for the data to be fully written to the IO device 420 before continuing regardless of the hardware implementations and/or the inter-process communication mechanisms.

Figure 5:
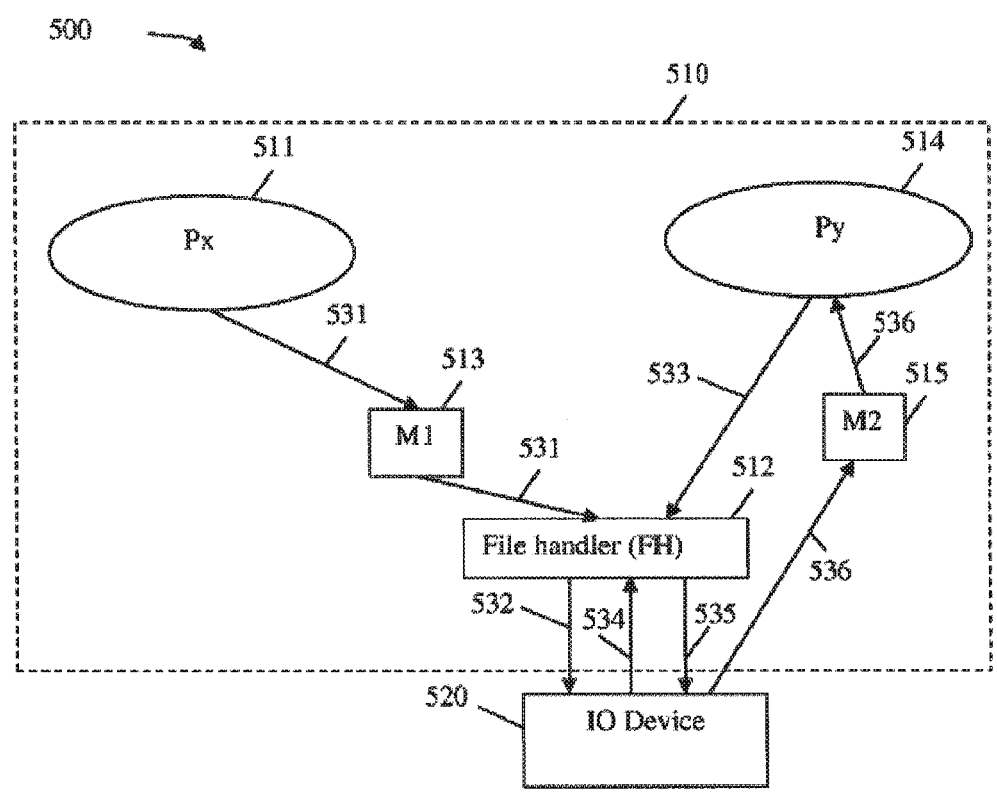
FIG. 5 is a schematic diagram illustrating an embodiment of synchronous IO read/write operations in an IO system.

FIG. 5 is a schematic diagram illustrating an embodiment of synchronous IO read/write operations in an IO system 500. The IO system 500 is substantially similar to the IO system 100. The IO system 500 employs substantially similar IO mechanisms as described in the method 200, but provides a more detailed view of the sequences of interactions between components of the system 500 during a synchronous write operation followed by a synchronous read operation. The IO system 500 comprises a data processing system 510, similar to the data processing system 110, and an IO device 520, similar to the IO device 120. The data processing system 510 comprises a first processing thread 511, denoted as Px, a second processing thread 514, denoted as Py, an FH 512, a first memory block 513, denoted as M1, and a second memory block 515, denoted as M2. The first processing thread 511 and the second processing thread 512 are similar to the processing threads 111. The FH 512 is similar to the FH 112. The memory blocks 513 and 515 are substantially similar to the memory block 413. The memory blocks 513 and 515 are located in the main memory of the data processing system 510. In some embodiments, the first processing thread 511 and the second processing thread 514 are allocated with different memory spaces within the main memory. Thus, the first memory block 513 may be located within a memory space of the first processing thread 511 and the second memory block 515 may be located within a memory space of the second processing thread 514.

In FIG. 5, the synchronous write operation is similar to the synchronous write operation described in the IO system 400. At step 531, the first processing thread 511 sends a synchronous write request to the FH 512 to write the data stored in the first memory block 513 to the IO device 520. After sending the synchronous write request, the first processing thread 511 waits for the completion of the IO write. At step 532, the FH 512 starts to write the data from the first memory block 513 to the IO device 520.

At step 533, prior to completing the data write to the IO device 520, the FH 512 receives a synchronous read request from the second processing thread 514 to read a block of data from the IO device 520, where the data corresponds to the data that the FH 512 is writing to the IO device 520. At step 534, the IO device 520 notifies the FH 512 that the data is written to the IO device 520.

At step 535, after the data is written to the IO device 520, the FH 512 initiates a read operation with the IO device 520 to fetch the data in response to the IO read request received from the second processing thread 514. At step 536, the FH 512 transfers the data from the IO device 520 to the second memory block 515. The step 536 may be performed after the step 535 is completed or in parallel with the step 535, for example, depending on the software and/or hardware implementations of the data processing system 510 and the IO device 520. It should be noted that each of the steps 532 and 534-536 may include one or more transactions and may vary depending on the hardware characteristics and/or implementations of the IO device 520 and the data processing system 510. In addition, the inter-process or inter-thread communication mechanisms between the processing threads 511 and 514, the memory blocks 513 and 515, and the FH 512 at steps 531 and 533 may vary depending on the software architectures and implementations of the data processing system 510. However, in the IO system 500, the first processing thread 511 stops while the IO write is in progress and the FH 512 waits for the IO write completion before proceeding with the IO read operation regardless of the hardware implementations and/or the inter-process communication mechanisms.

Figure 6:
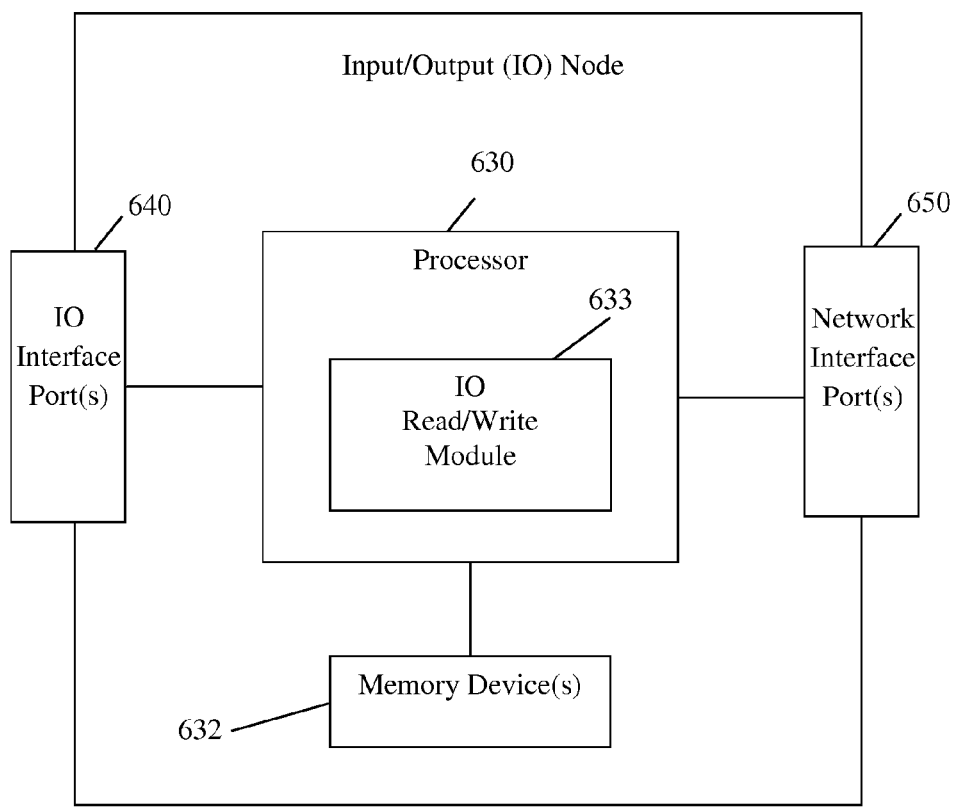
FIG. 6 is a schematic diagram of an embodiment of an IO node.

FIG. 6 is a schematic diagram of an embodiment of an IO node 600, which may act as a network node in a data network or a portion of a data processing system, such as the data processing system 110. The IO node 600 may be configured to perform speculative IO write and/or IO read-ahead operations as described more fully below. The IO node 600 is included for purposes of clarity of discussion, but is in no way meant to limit the application of the present disclosure to a particular system embodiment or class of system embodiments. At least some of the features/methods described in the disclosure may be implemented in a computing apparatus or component such as the IO node 600. For instance, the features/methods in the disclosure may be implemented using hardware, firmware, and/or software installed to run on hardware. As shown in FIG. 6, the IO node 600 may comprise a processor 630 coupled to one or more memory devices 632, one or more IO interface ports 640, and one or more network interface ports 650. The processor 630 may comprise one or more multi-core processors. In some embodiments, the memory devices 632 may be part of the processor 630, where the memory devices 632 may function as data stores, buffers, etc. The processor 630 may be implemented as a general processor or may be part of one or more application specific integrated circuits (ASICs) and/or digital signal processors (DSPs). The processor 630 may comprise an IO read/write module 633, which may implement methods 700, 1000, 1100, 1200, and 1300 and/or IO mechanisms described in systems 800 and 900 as discussed more fully below. As such, the inclusion of IO read/write module 633 and associated methods and systems provides improvement to the functionality of the IO node 600. Further, by altering the memory device 632, the IO read/write module 633 effects a transformation of a particular article (e.g., memory device 632) to a different state. In an alternative embodiment, the IO read/write module 633 may be implemented as instructions stored in the memory devices 632, which may be executed by processor 630. The memory device 632 may comprise a cache for temporarily storing content, e.g., a RAM. Additionally, the memory device 632 may comprise a long-term storage for storing content relatively longer, e.g., a read-only memory (ROM). For instance, the cache and the long-term storage may include dynamic random access memories (DRAMs). The IO interface ports 640 may be coupled to IO devices, such as the IO devices 120 and may comprise hardware logics and/or components configured to read data from the IO devices and/or write data to the IO devices. The network interface ports 650 may be coupled to a computer data network and may comprise hardware logics and/or components configured to receive data frames from other network nodes in the network and/or transmit data frames to the other network nodes.

It is understood that by programming and/or loading executable instructions onto the IO node 600, at least one of the processor 630 and/or memory device 632 are changed, transforming the IO node 600 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 7:
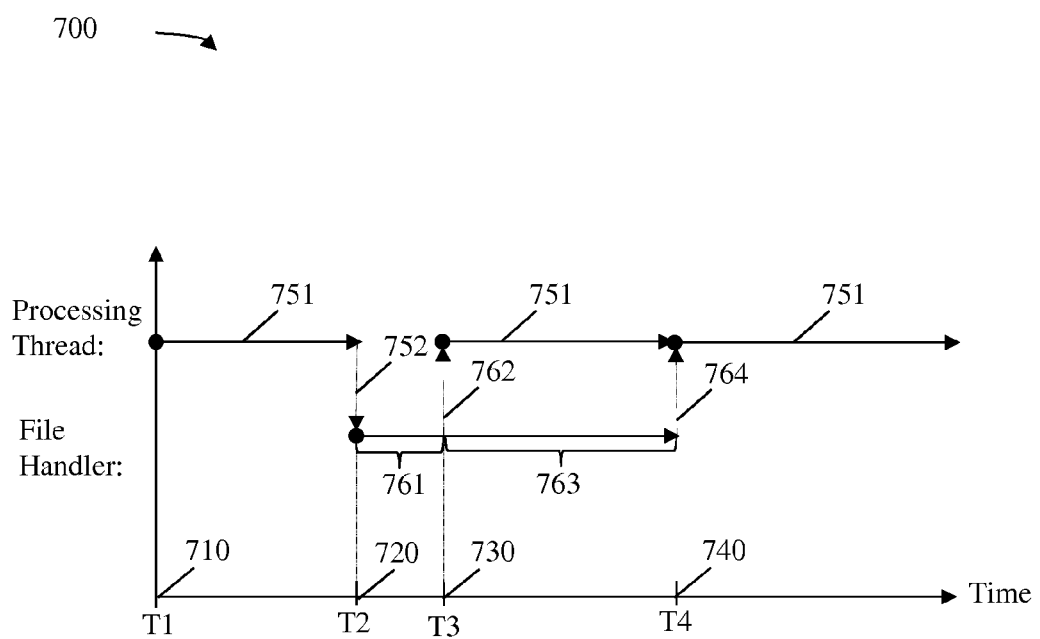
FIG. 7 is a timing diagram illustrating an embodiment of a speculative synchronous IO write method.

FIG. 7 is a timing diagram illustrating an embodiment of a speculative synchronous IO write method 700. The method 700 is implemented in a data processing system, such as the data processing system 110 and the IO node 600. The timing diagram illustrates activities of a processing thread, such as the processing thread 111, and a file handler, similar to the FH 112, during a speculative synchronous IO write operation. The method 700 begins at time 710, denoted as T1, when the processing thread starts an execution 751 that invokes an IO write operation to an IO device, such as the IO device 120. At time 720, denoted as T2, the processing thread sends an IO write request 752 to the file handler and waits for the file handler to return. For example, the IO write request 752 indicates a request to write a data from a memory block M located in the main memory, such as the memory device 632, of the data processing system to the IO device. Upon receiving the IO write request 752, the file handler applies a read-only access permission 761 to the memory block M, for example, by setting a read-only flag, to protect the memory block M from overwrites. At time 730, denoted as T3, the file handler returns to the processing thread indicating a speculative write completion 762 and performs an IO transfer 763 to write the data from the memory block M to the IO device. The speculative write completion 762 refers to the assumption that the data at the memory block M may not be overwritten while the IO transfer is in progress. The signaling of speculative write completion 762 enables the processing thread to proceed with the execution 751 speculatively.

Since the speculative write completion 762 is sent prior to the completion of the IO transfer 763, correction mechanisms are employed to prevent rewriting of the memory block M during the IO transfer 763. For example, the file handler configures an exception handler to trap any write attempts to the memory block M. The file handler provides the exception handler with the memory location (e.g., memory address range) of the memory block M and dynamically links the exception handler to the processing thread. When the exception handler detects a write attempt to the memory block M, the exception handler notifies the file handler and the file handler blocks the processing thread from proceeding with the memory write. It should be noted that the file handler may configure the exception handler and link the exception handler to the processing thread in addition to applying the read-only access permission 761 to the memory block M prior to returning to the processing thread at time 730.

At time 740, denoted as T4, the file handler completes the IO write operation, restores the access permission of the memory block M back to read and write accessible, for example, by clearing the read-only flag, unlinks the exception handler from the processing thread, and sends an IO write completion 764 to the processing thread to indicate that the data is fully written or saved to the IO device. Upon receiving the IO write completion 764, the processing thread continues with the execution 751 non-speculatively. In contrast to the synchronous IO mechanisms described in the method 200, the method 700 enables the processing thread to continue speculatively during the IO write instead of waiting for the completion of the IO write. In contrast to the asynchronous IO mechanisms described in the method 300, the method 700 enables the processing thread to process the same job speculatively instead of switching to another job during the IO write. Thus, the method 700 may improve IO efficiency.

Figure 8:
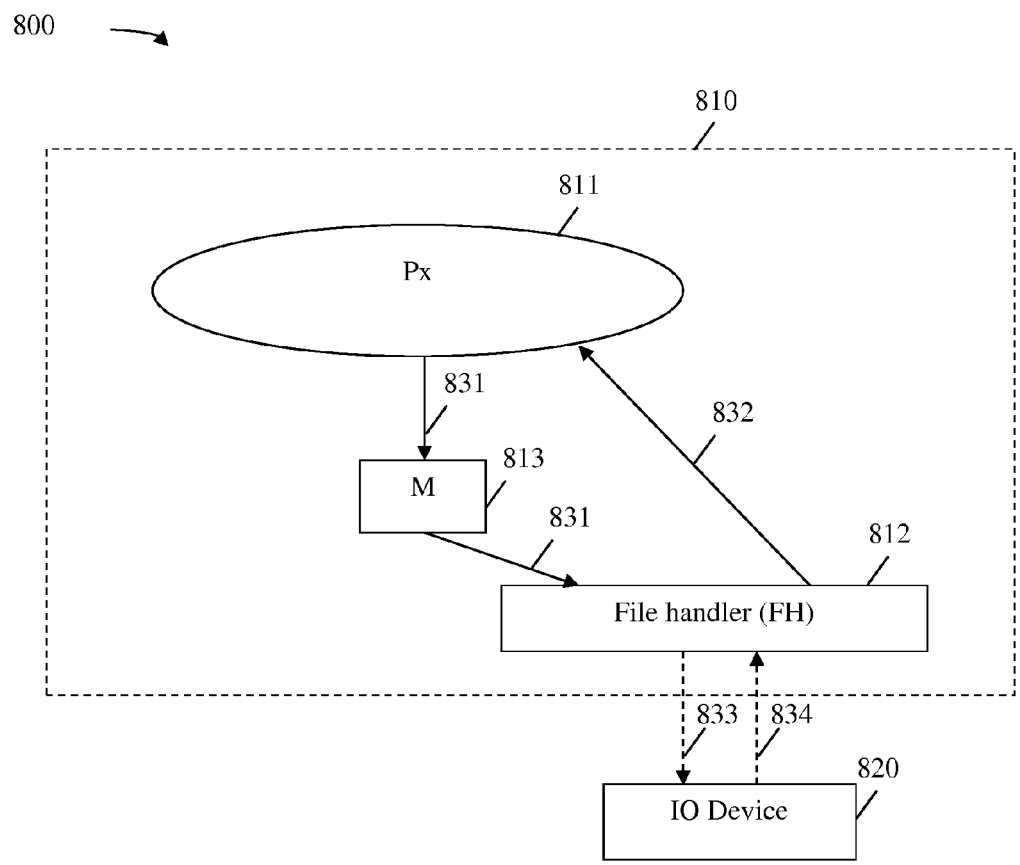
FIG. 8 is a schematic diagram illustrating an embodiment of a speculative synchronous IO write operation in an IO system.

FIG. 8 is a schematic diagram illustrating an embodiment of a speculative synchronous IO write operation in an IO system 800. The IO system 800 comprises substantially similar components as in the IO system 100 and 400, but optimizes IO write by performing speculative synchronous IO write, similar to the method 700. The IO system 800 comprises a data processing system 810, similar to the data processing system 110, and an IO device 820, similar to the IO device 120. The data processing system 810 comprises a processing thread 811, denoted as Px, similar to the processing thread 111, an FH 812, similar to the FH 112, and a memory block 813, denoted as M, similar to the memory block 413. The memory block 813 may be located within a memory space allocated to the processing thread 811.

As shown in FIG. 8, at step 831, the processing thread 811 sends a request, for example, via an IO write function call, to the FH 812 to write the data located in the memory block 813 to the IO device 820. Upon receiving the request, the FH 812 marks the memory block 813 as read-only, configures an exception handler with the memory location or address of the memory block 813, and dynamically links the exception handler to the processing thread 811. At step 832, the FH 812 returns to the processing thread 811 indicating a speculative IO write completion. After receiving the speculative IO write completion, the processing thread 811 continues to process speculatively. At step 833, after sending the speculative IO write completion, the FH 812 interfaces with the IO device 820 to write the data from the memory block 813 to the IO device 820. At step 834, upon the completion of the IO write, the IO device 820 sends a notification to the FH 812 to indicate that the data is completely written to the IO device 820. After the IO write is completed, the FH 812 restores the permission access of the memory block 813 to be read and/or write access and unlinks the exception handler from the processing thread 811. The FH 812 may optionally send a notification to the processing thread 811 indicating the IO write completion and the processing thread 811 may continue to process non-speculatively as described in the method 700. In some embodiments, the step 832 may be performed after the step 833, but prior to the step 834. It should be noted that the steps 833 and 834 may include one or more transactions and may vary depending on the hardware characteristics or implementations of the IO device 820 and the data processing system 810. In addition, the inter-process or inter-thread communication mechanisms between the processing thread 811, the memory block 813, and the FH 812 at steps 831 and 832 may vary depending on the software architecture and implementations of the data processing system 810. However, the processing thread 811 continues to process speculatively while data is transferred to the IO device 820 regardless of the hardware implementations and/or the inter-process communication mechanisms.

In some embodiments, at step 831, when the FH 812 receives the IO write request from the processing thread 811, the FH 812 copies the data from the memory block 813 to an internal buffer B, for example, located in a memory space of the FH 812. In such embodiments, after copying the data to the internal buffer B, the FH 812 restores the access permission of the memory block 813 back to be read and write accessible and unlinks the exception handler from the processing thread 811 instead of waiting until the data is physically written to the IO device 820. Subsequently, the FH 812 transfers the data from the internal buffer B to the IO device 820. In addition, the FH 812 may write the data to the IO device 820 and copy the data to the internal buffer B simultaneously, where the FH 812 may perform some additional synchronization between the IO transfer and the data copy.

Figure 9:
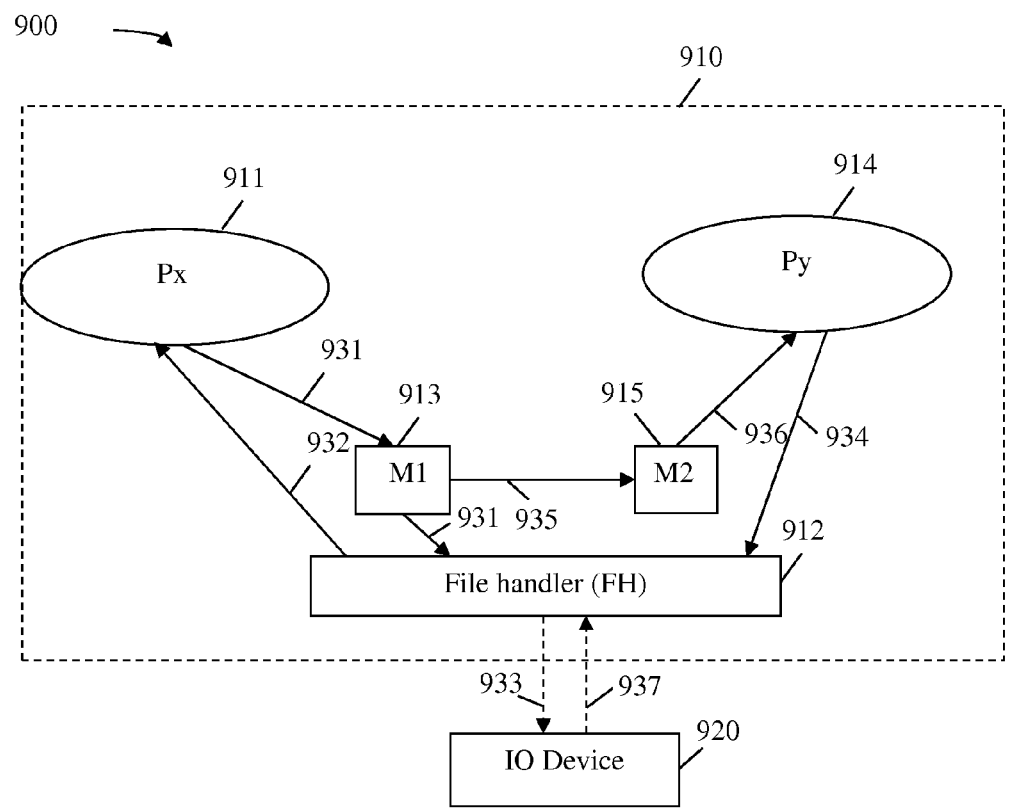
FIG. 9 is a schematic diagram illustrating an embodiment of a speculative synchronous IO write operation and an IO read-ahead operation in an IO system.

FIG. 9 is a schematic diagram illustrating an embodiment of a speculative synchronous IO write operation and an IO read-ahead operation in an IO system 900. The system 900 comprises substantially similar system components as in the IO system 100 and 500, but optimizes IO write and IO read by performing speculative synchronous IO write, similar to the method 700, and IO read-ahead operations. The system 900 comprises a data processing system 910, similar to the data processing systems 110, 410, 510, and 810, and an IO device 920, similar to the IO devices 120, 420, 520, and 820. The data processing system 910 comprises a first processing thread 911, denoted as Px, a second processing thread 914, denoted as Py, an FH 912, a first memory block 913, denoted as M1, and a second memory block 915, denoted as M2. The first processing thread 911 and the second processing thread 914 are similar to the processing threads 111, 411, 511, 514, and 811. The FH 912 is similar to the FH 112 and 812. The memory blocks 913 and 915 may be similar to the memory blocks 413, 513, 515, and 813 and may be located in the main memory of the data processing system 910. Similar to the IO system 500, the first memory block 913 may be located within a memory space of the first processing thread 911 and the second memory block 915 may be located within a memory space of the second processing thread 914.

As shown in FIG. 9, the synchronous write operation is similar to the speculative synchronous IO write operation described in the IO system 800. For example, at step 931, the first processing thread 911 requests the FH 912 to write data from the first memory block 913 to the IO device 920. At step 932, upon receiving the request, the FH 912 sets the access permission of the first memory block 913 to read-only, dynamically links an exception handler to the first processing thread 911, and signals a speculative write completion to the first processing thread 911. At step 933, after signaling the speculative write completion, the FH 912 performs IO data transfer from the first memory block 913 to the IO device 920.

At step 934, prior to completing the IO data transfer, the FH 912 receives an IO read request from the second processing thread 914 to read data from the IO device 920, where the data corresponds to the data that the FH 912 is writing to the IO device 920. At step 935, the FH 912 redirects the IO read request to copy the data from the first memory block 913 to the second memory block 915. The reading of the data from the first memory block 913 instead of from IO device 920 is referred to as the IO read-ahead operation. At step 936, after completing the data copy, the FH 912 sends an IO read completion to the second processing thread 914. In some embodiments, the FH 912 may copy the data from the first memory block 913 to an internal buffer B and transfer the data from the buffer B to the IO device 920. In such embodiments, the FH 912 may redirect an IO read request to read the data from the buffer B before the data is completely transferred to the IO device 920.

At step 937, the IO device 920 notifies the FH 912 that the data is written to the IO device 920. Upon completing the saving of the data to the IO device 920, the FH 912 clears the read-only access of the first memory block 913 and unlinks the exception handler from the first processing thread 911. The FH 912 may coordinate the clearing of the read-only access and the unlinking of the exception handler with the IO read request when the IO write is completed while the data is copied from the first memory block 913 to the second memory block 915. In some embodiments, the step 932 may be performed after the step 933, but prior to the step 937. It should be noted that the steps 931, 933, 936, and 937 may include one or more transactions and may vary depending on the hardware characteristics and/or implementations of the IO device 920 and the data processing system 910. In addition, the inter-process or inter-thread communication mechanisms between the processing threads 911 and 914, the memory blocks 913 and 915, and the FH 912 may vary depending on the software architecture and implementations of the data processing system 910. However, the first processing thread 911 continues speculatively during the IO write and the FH 912 redirects an IO read to read the data from the first memory block 913 while writing the data to the IO device 920 regardless of the hardware and/or the inter-process communication mechanisms.

Figure 10:
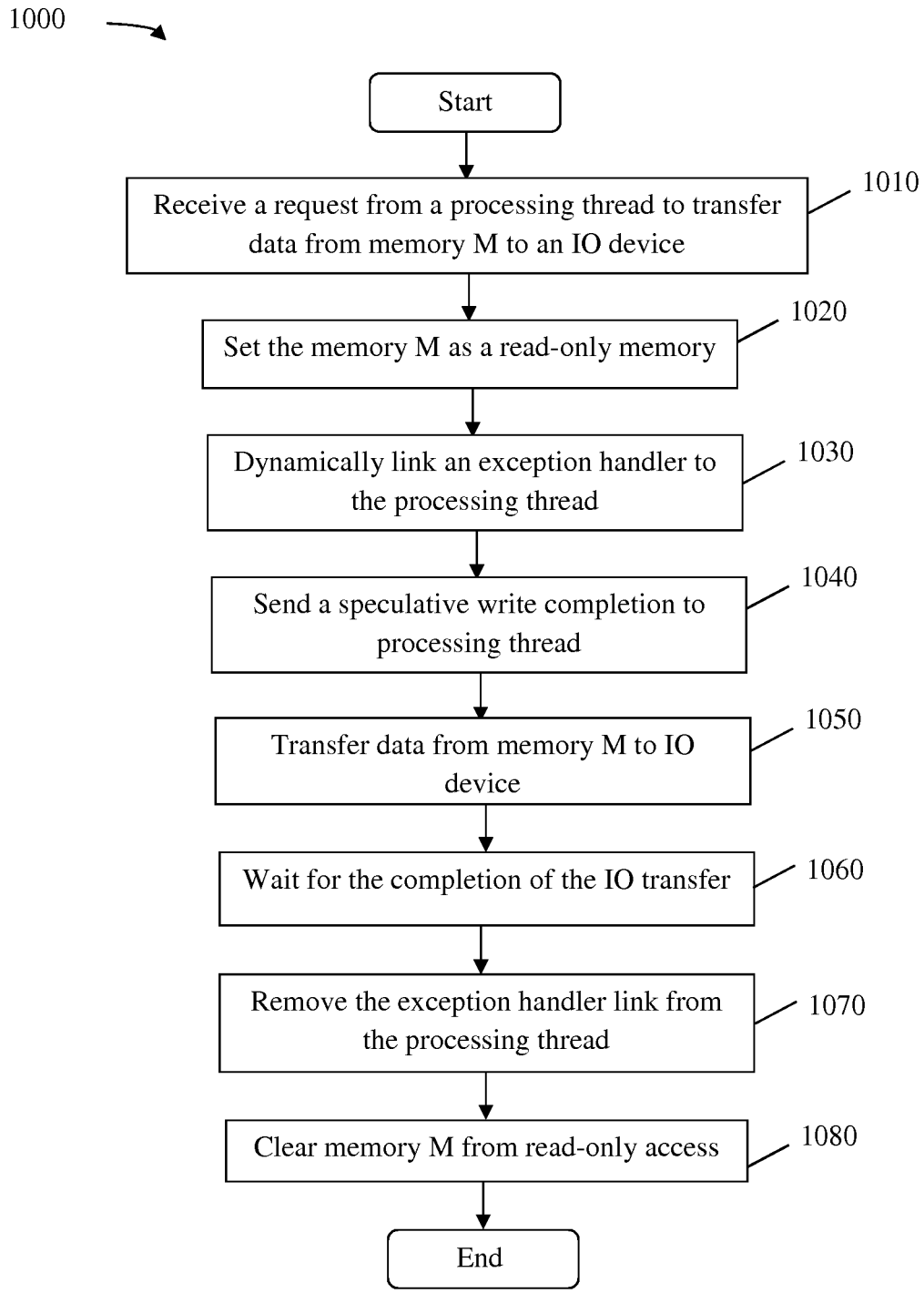
FIG. 10 is a flowchart of an embodiment of a method for performing speculative synchronous IO write.

FIG. 10 is a flowchart of an embodiment of a method 1000 for performing speculative synchronous IO write. The method 1000 is implemented in a data processing system, such as the data processing systems 110, 810, and 910 and the IO node 600. For example, the method 1000 is implemented in a file handler of the data processing system. The method 1000 is similar to the method 700 and the speculative IO write mechanisms described in the IO system 800 and 900 is employed when receiving an IO write request. At step 1010, a request to transfer data from memory M, such as the memory block 813 and 913, to an IO device, such as the IO device 820 and 920, is received, for example, from a processing thread, such as the processing thread 811 and 911. At step 1020, the memory M is set as a read-only memory, for example, by setting a read-only flag. At step 1030, an exception handler is dynamically linked to the processing thread. For example, the exception handler is configured with the memory location of the memory M or the memory address range of the data. The exception handler is configured to detect any write attempt to the memory M and to prevent the memory M from overwrite prior to completely transferring the data from the memory M to the IO device as discussed more fully below.

At step 1040, a speculative write completion is sent to the processing thread to enable the processing thread to continue execution speculatively without waiting for the data to be transferred to the IO device. At step 1050, the data is transferred from the memory M to the IO device. At step 1060, waits for the completion of the IO transfer. At step 1070, after completing the transfer, the exception handler link is removed from the processing thread. At step 1080, the memory M is restored from the read-only memory back to a read/write accessible memory, for example, by clearing the read-only flag.

Figure 11:
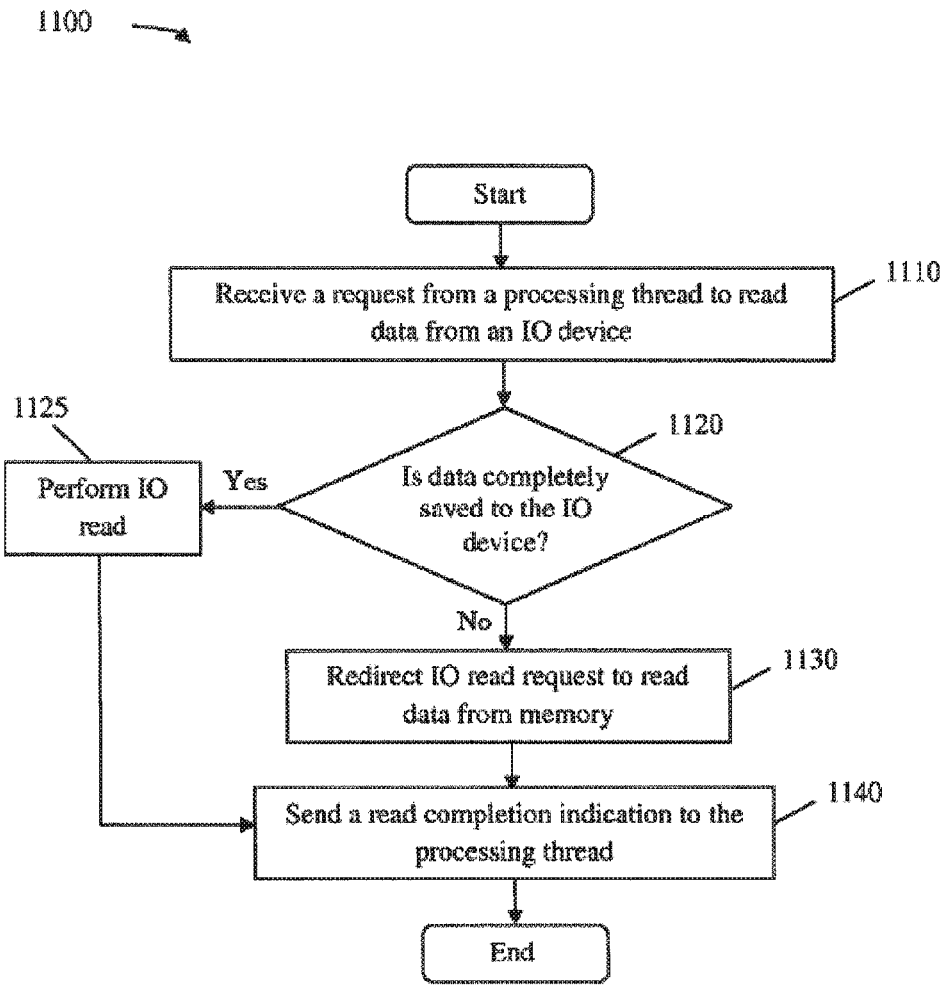
FIG. 11 is a flowchart of an embodiment of a method for performing an IO read-ahead operation.

FIG. 11 is a flowchart of an embodiment of a method 1100 for performing an IO read-ahead operation. The method 1100 is implemented in a data processing system, such as the data processing systems 110, 810, and 910 and the IO node 600. The method 1100 is similar to the IO read-ahead mechanisms described in the IO system 900 and is employed when receiving an IO read request. At step 1110, a request to read data from an IO device, such as the IO devices 120, 420, 520, 820, and 920, is received, for example, from a processing thread, such as the processing thread 914. At step 1120, a determination is made whether the data is completely transferred to the 10 device. If the data transfer is in progress, for example, from a memory M, such as the memory blocks 813 and 913, to the IO device, next at step 1130, the IO read request is redirected to read from the memory M, where the redirecting of the IO read request is referred to as the IO read-ahead operation. At step 1140, a read completion indication is sent to the processing thread.

If the data is written to the IO device at step 1120, next at step 1125, IO read is performed to fetch data from the IO device and save the data to a memory location provided by the processing thread. At step 1140, after completing the IO read, a read completion indication is sent to the processing thread.

Figure 12:
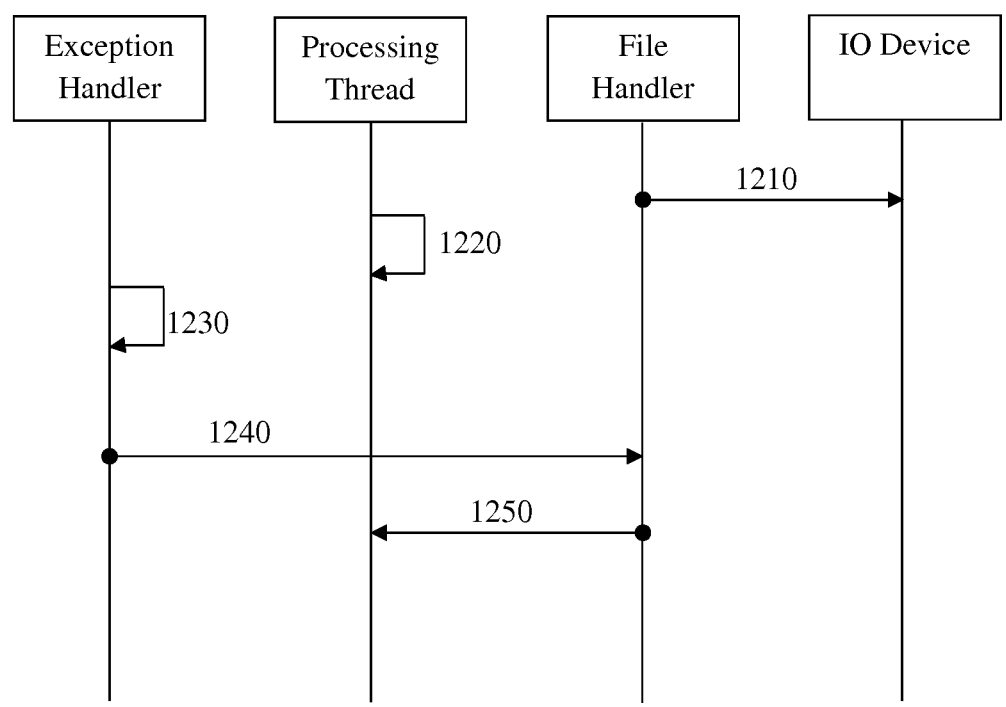
FIG. 12 is a protocol diagram of an embodiment of a method for handling exceptions during speculative synchronous IO write.

FIG. 12 is a protocol diagram of an embodiment of a method 1200 for handling exceptions during speculative synchronous IO write. The method 1200 is implemented in a data processing system, such as the data processing systems 110, 810, and 910 and the IO node 600. The method 1200 provides a detailed view of the interactions between a processing thread, such as the processing threads 811 and 911, a file handler, such as the FH 812 and 912, an exception handler, and an IO device, such as the IO devices 120, 420, 520, 820, and 920. The method 1200 begins while an IO write requested by the processing thread is in progress. For example, the IO write transfers data from a block of memory M, similar to the memory blocks 813 and 913, to the IO device, the memory M is marked as read-only, and the exception handler is linked to the processing thread. At step 1210, the file handler performs IO write with the IO device to transfer the data from the memory M to the IO device. At step 1220, the processing thread is executing speculatively and determines to write to the memory M before the data in the memory M is completely written to the IO device. At step 1230, the exception handler detects a write attempt to the memory M, initiated by the processing thread at step 1220. At step 1240, the exception handler notifies the file handler that the processing thread is attempting to write to the memory M and returns the control to the file handler. At step 1250, the file handler stops the processing thread from writing to the memory M, for example, by sending an interrupt to the processing thread to instruct the processing thread to wait for the completion of the IO write or by blocking the processing thread by putting the processing thread into a thread wait state.

Figure 13:
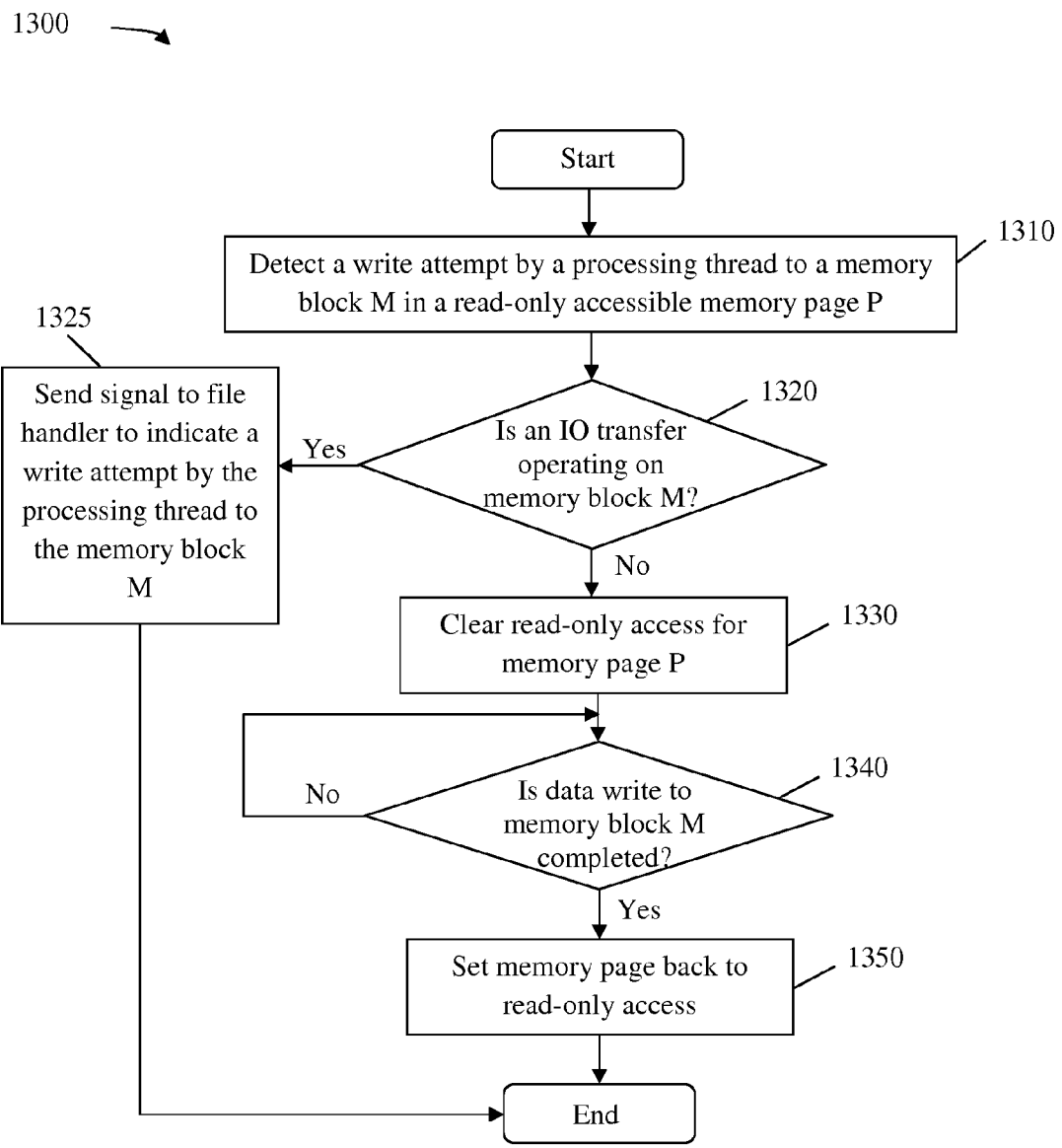
FIG. 13 is a flowchart of an embodiment of a method for performing memory protection during speculative synchronous IO write.

FIG. 13 is a flowchart of an embodiment of a method 1300 for performing memory protection during speculative synchronous IO write. The method 1300 is implemented in a data processing system, such as the data processing systems 110, 810, and 910 and the IO node 600. For example, the method 1300 is implemented by an exception handler. In some systems, the memory, such as the memory device 632, is divided into a plurality of memory pages and access permission may be set or cleared in terms of memory page. However, the size of a memory page is relatively large, for example, about 4 kilobytes (kBytes) and an IO write may transfer a portion of the memory page, for example. The method 1300 allows memory writes to other portions of the memory while transferring data from the memory M to the IO device. The method 1300 begins when an exception handler is configured with a memory location or memory address range of a particular block of memory that is marked as read-only due to an IO write in progress. For example, the particular block of memory is located in a memory page P and the memory page P is set to read-only.

At step 1310, a write access by a processing thread to a memory block M in the read-only accessible memory page P is detected. At step 1320, a determination is made whether an IO transfer is operating on the memory block M. If an IO transfer is operating on the memory block M, next at step 1325, a signal is sent to a file handler, such as the FH 812 and 912, to indicate a write attempt by the processing thread to the memory block M while an IO transfer is operating on the memory block M, where the file handler may subsequently put the processing thread to a thread wait state as described in the method 1200.

If there is no IO transfer operating on the memory block M in the step 1320, next at step 1330, the read-only accessible memory page P is cleared from the read-only access to enable the memory write to proceed. At step 1340, a determination is made whether the data write to the memory block M is completed or whether the memory block is updated. If the data write is not completed, the step 1340 is repeated to check for the data write completion. If the data write is completed, next at step 1350, the memory page P is set back to read-only access.

The disclosed embodiments enable a processing thread, such as the processing threads 111, 811, 911, and 914, to initiate an IO write to transfer data from a memory block M, such as the memory blocks 813 and 913, to an IO device, such as the IO devices 120, 420, 520, 820, and 920, to continue execution speculatively during the IO write. In addition, the disclosed embodiments provide IO read-ahead mechanisms for other processing threads to read the data from the memory block M prior to completely writing the data to the IO device. Thus, the disclosed embodiments improve IO efficiency substantially. In many systems and/or applications, the probability of writing into the memory block M by the processing thread while the data is written to the IO device is relatively low. The disclosed embodiments enable low priority applications at a busy data center to continue execution after initiating IO writes instead of waiting for the completion of the higher priority IO writes.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented in a data processing system, comprising:
   receiving an input/output (IO) write request from a processing thread to transfer data from a memory of the data processing system to an IO device;
   setting the memory as read-only memory to protect the data from overwrite before the data is transferred to the IO device;
   sending, in response to the IO write request, a speculative IO write completion response to the processing thread to enable the processing thread to continue execution without waiting for the data to be transferred to the IO device;
   transferring the data from the memory to the IO device;
   restoring the memory from the read-only memory to read and write accessible memory after transferring the data from the memory to the IO device;
   receiving, from an exception handler, a signal indicating that the processing thread attempts to write to the memory before the data is transferred to the IO device;
   instructing, in response to the signal, the processing thread to enter a wait state;
   instructing the processing thread to proceed with writing to the memory after the data is transferred to the IO device;
   configuring the exception handler with a memory address range of the data to enable the exception handler to trap write attempts to the memory address range of the data;
   dynamically linking the exception handler to the processing thread; and
   unlinking the exception handler from the processing thread after transferring the data from the memory to the IO device.

2. The method of claim 1, further comprising:
   receiving an IO read request to read the data from the IO device before the data is transferred to the IO device; and redirecting the IO read request to read the data from the memory.

3. The method of claim 1, further comprising:
copying the data from the memory to an internal buffer;
restoring the memory from the read-only memory to read and write accessible memory after copying the data from the memory to the internal buffer; and
transferring the data from the internal buffer to the IO device.

4. The method of claim 3, wherein at least a portion of the data is transferred from the memory to the IO device while the data is copied from the memory to the internal buffer.

5. The method of claim 3, further comprising:
receiving an IO read request to read the data from the IO device before the data is transferred to the IO device; and
redirecting the IO read request to read the data from the internal buffer.

6. The method of claim 3, further comprising:
receiving a signal indicating that the processing thread attempts to write to the memory before the data is copied to the internal buffer;
instructing, in response to the signal, the processing thread to enter a wait state; and
instructing the processing thread to proceed with writing to the memory after the data is copied to the internal buffer.

7. The method of claim 6, further comprising:
configuring an exception handler with a memory address range of the data to enable the exception handler to trap write attempts to the memory address range of the data;
dynamically linking the exception handler to the processing thread; and
unlinking the exception handler from the processing thread after copying the data from the memory to the internal buffer,
wherein the signal is received from the exception handler.

8. A computer program product comprising computer executable instructions for a file handler, wherein the computer executable instructions are stored on a non-transitory computer readable medium such that when executed by a computing device, the instructions cause the file handler to:
receive a first message from a processing thread comprising an input/output (IO) write request to transfer data from a memory of the computing device to an IO device;
configure an exception handler to protect the data from overwrite before the data is completely transferred to the IO device;
send a second message comprising a speculative IO write completion response to the processing thread without waiting for the data to be completely transferred to the IO device, wherein the speculative IO write completion response enables the processing thread to continue execution; and
unlink the exception handler from the processing thread after the data is completely transferred to the IO device,
wherein configuring the exception handler comprises configuring the exception handler with a memory address range of the data and dynamically linking the exception handler to the processing thread.

9. The computer program product of claim 8, wherein the instructions further cause the file handler to:
set a read-only flag to indicate that the memory is accessibly for read-only;
transfer the data from the memory to the IO device; and
clear the read-only flag after the data is completely transferred to the IO device to indicate that the memory is accessible for read and write.

10. The computer program product of claim 8, wherein the instructions further cause the file handler to:
receive a third message comprising a request to read the data from the IO device, wherein the third message is received before the data is completely transferred to the IO device; and
copy the data directly from the memory in response to the third message.

11. The computer program product of claim 8, wherein the memory corresponds to a memory page, wherein the data is stored in a portion of the memory page, wherein the instructions further cause the file handler to set a read-only flag indicating that the memory page is for read-only access, and wherein the file handler configures the exception handler to:
detect a write attempt to the memory page at a memory location outside of the memory address range of the data;
clear the read-only flag to enable the file handler to write to the memory location outside of the memory address range of the data;
determine that the memory location is updated; and
set the read-only flag to indicate that the memory page is for read-only access after the memory location outside of the memory address range of the data is updated.

12. The computer program product of claim 8, wherein the file handler configures the exception handler to:
detect a write attempt to the memory in the memory address range of the data by the processing thread; and
send a third message to the file handler to indicate the write attempt by the processing thread.

13. The computer program product of claim 12, wherein the instructions further cause the file handler to:
receive the third message from the exception handler indicating the write attempt to the memory by the processing thread; and
send a fourth message to the processing thread to instruct the processing thread to wait until the data is completely transferred to the IO device before proceeding to write to the memory.

14. An apparatus comprising:
an input/output (IO) interface port configured to communicate with an IO device;
a memory coupled to the IO interface port; and
a processor coupled to the memory and the IO interface port, wherein the processor is configured to:
receive a first message from a processing thread, wherein the first message comprises an IO write request to transfer data from the memory to the IO device;
send, in response to the IO write request, a second message comprising a speculative write completion response to the processing thread to enable the processing thread to continue execution before the data is completely transferred to the IO device;
receive a third message comprising an IO read request to read the data from the IO device, wherein the third message is received before the data is completely transferred to the IO device;
read the data directly from the memory in response to the IO read request; and
protect the memory from memory overwrite before the data is completely transferred to the IO device by:
setting the memory to a read-only accessible memory;

configuring an exception handler with a memory address range of the data to enable the exception handler to trap a write attempt to the memory address range of the data:

dynamically linking the exception handler to the processing thread;

transferring the data from the memory to the IO device:

restoring the memory from the read-only accessible memory to a read and write accessible memory after the data is completely transferred to the IO device; and unlinking the exception handler from the processing thread after the data is completely transferred to the IO device.

15. The apparatus of claim 14, wherein the processor is further configured to:

receive a fourth message from the exception handler indicating the write attempt to the memory address range of the data; and send, in response to the fourth message, a fifth message to the processing thread to instruct the processing thread to enter a thread wait state to wait until the data is completely transferred to the IO device.

* * * * *